July 4, 1933.  C. WILHJELM ET AL  1,916,401
CONTROL SYSTEM AND APPARATUS
Filed March 27, 1928    5 Sheets-Sheet 1
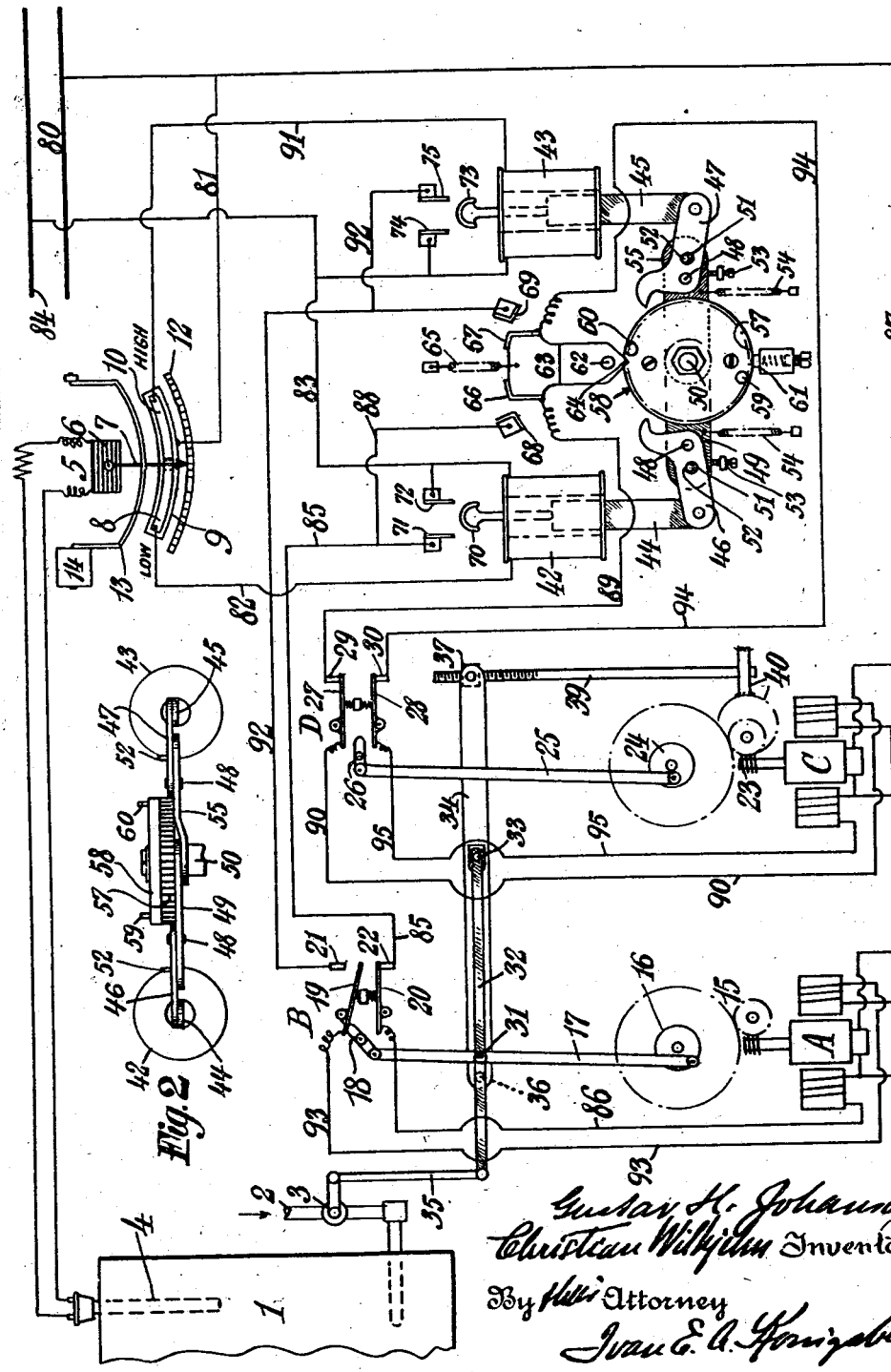

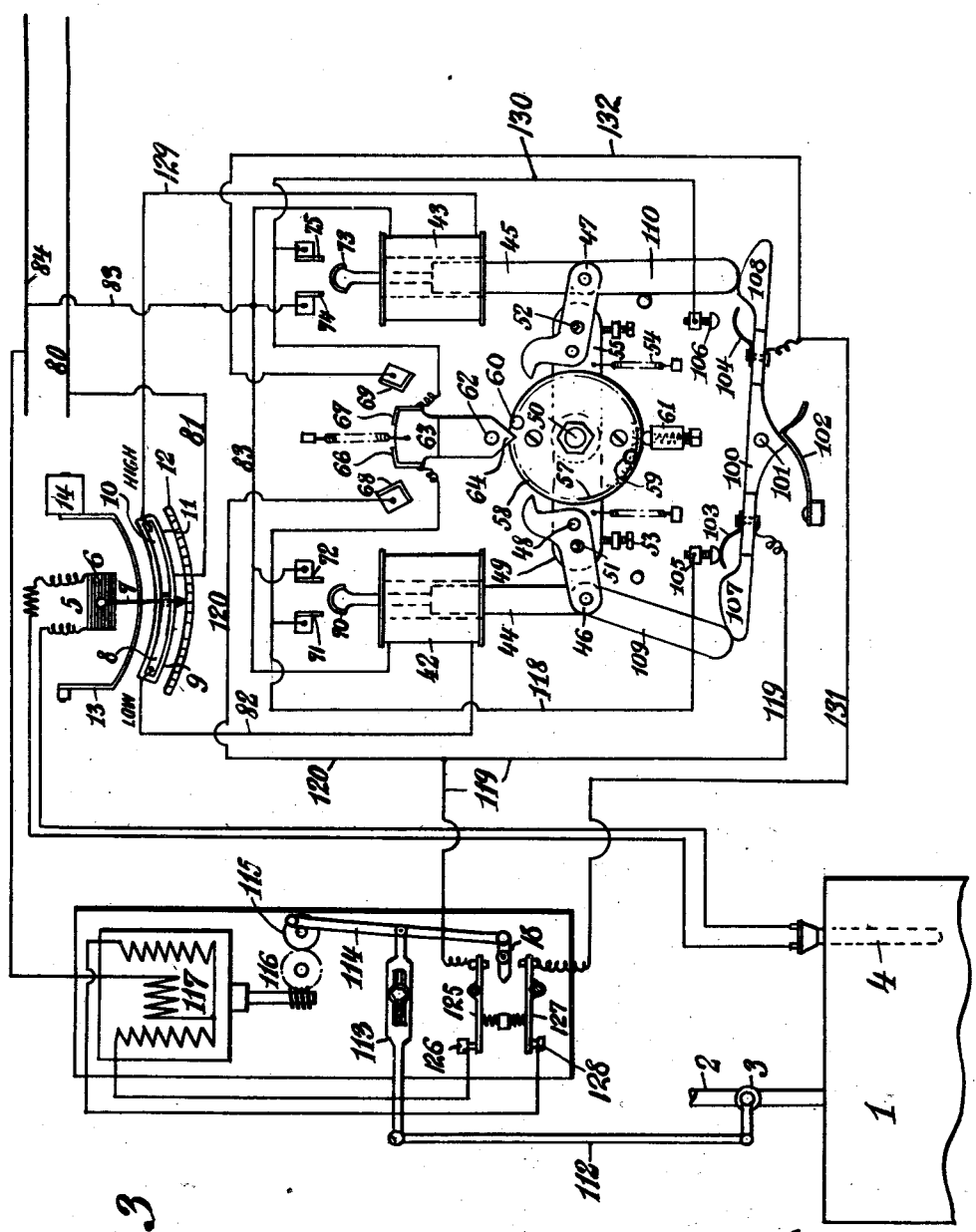

July 4, 1933.  C. WILHJELM ET AL  1,916,401
CONTROL SYSTEM AND APPARATUS
Filed March 27, 1928   5 Sheets-Sheet 3
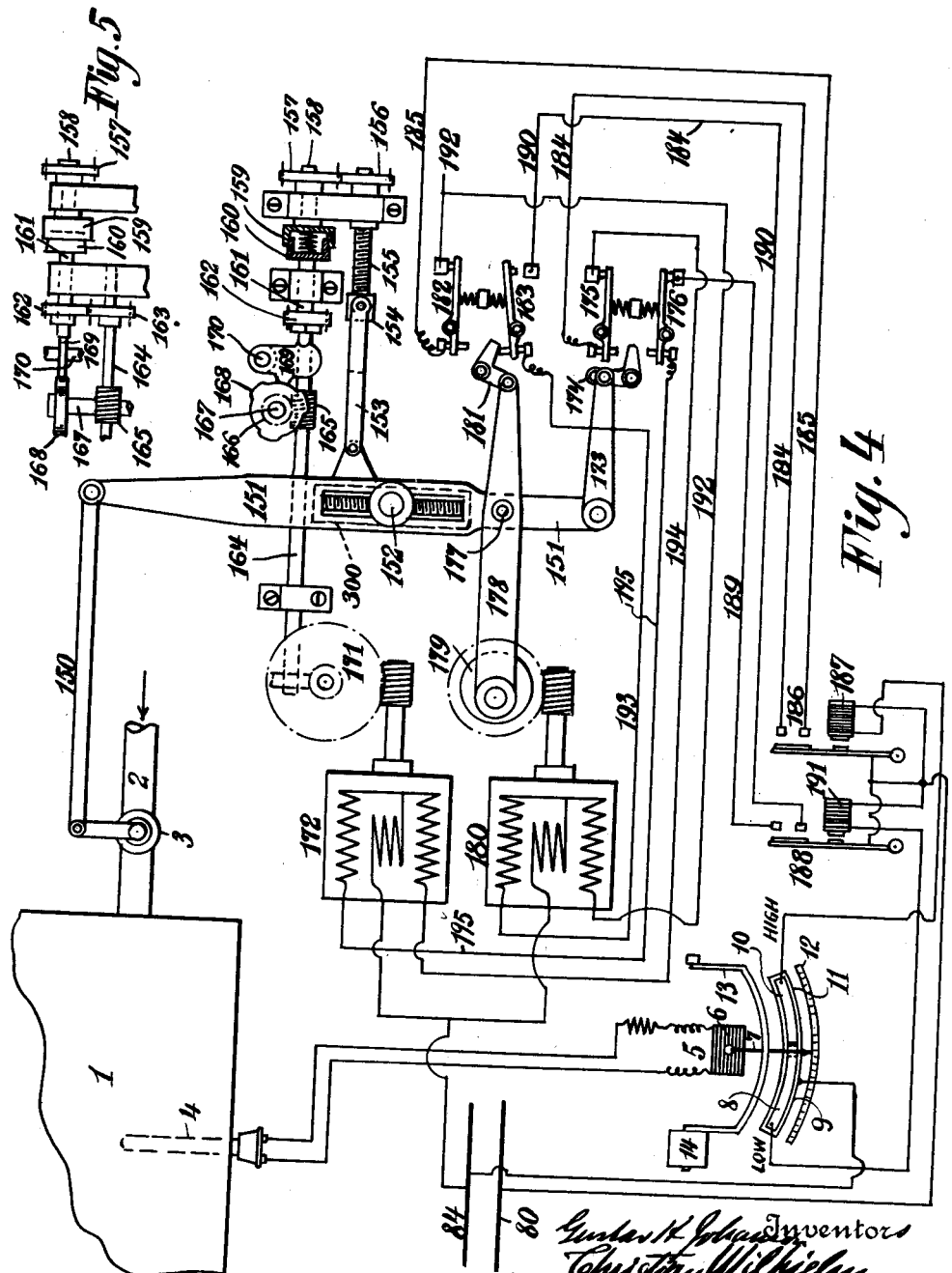

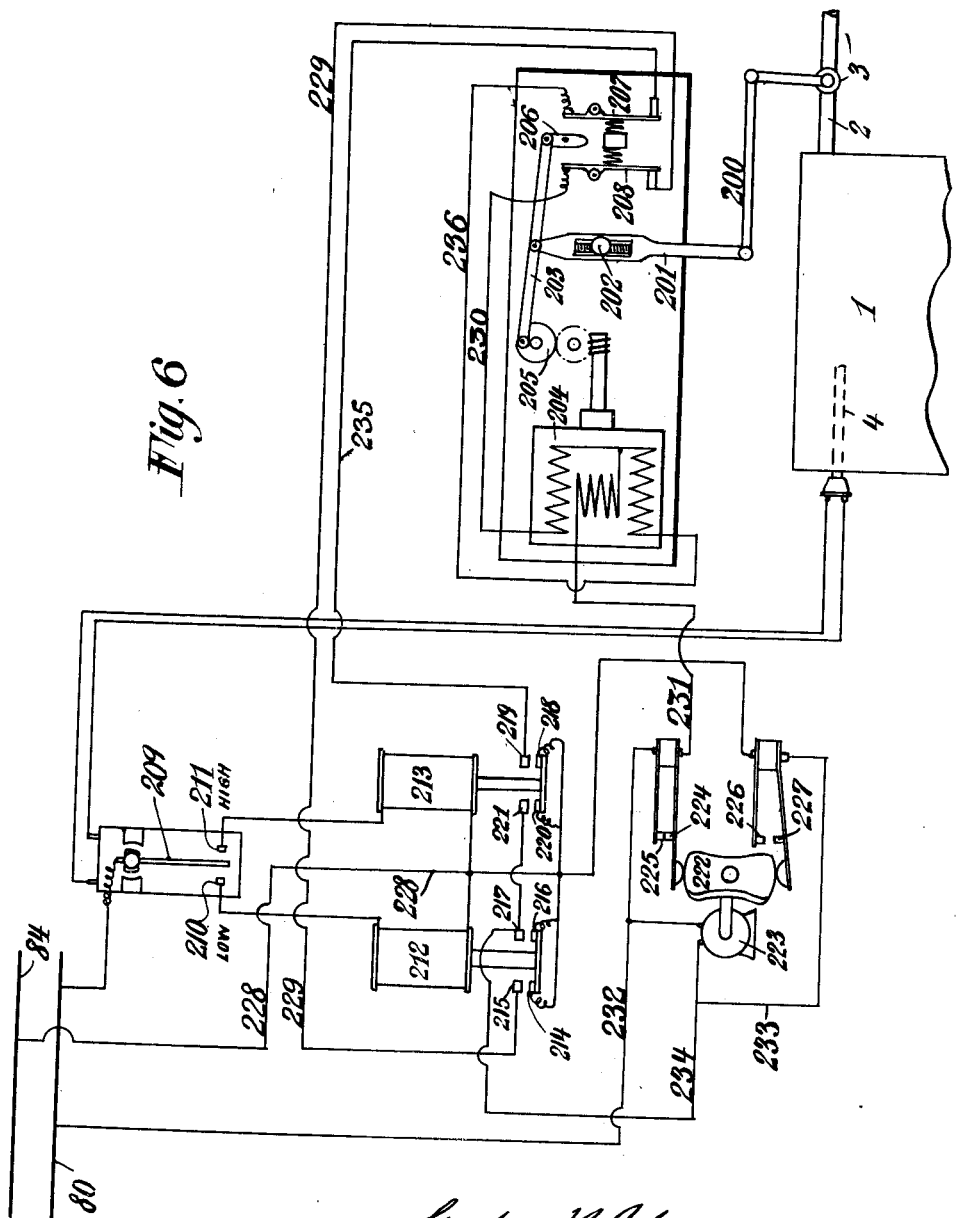

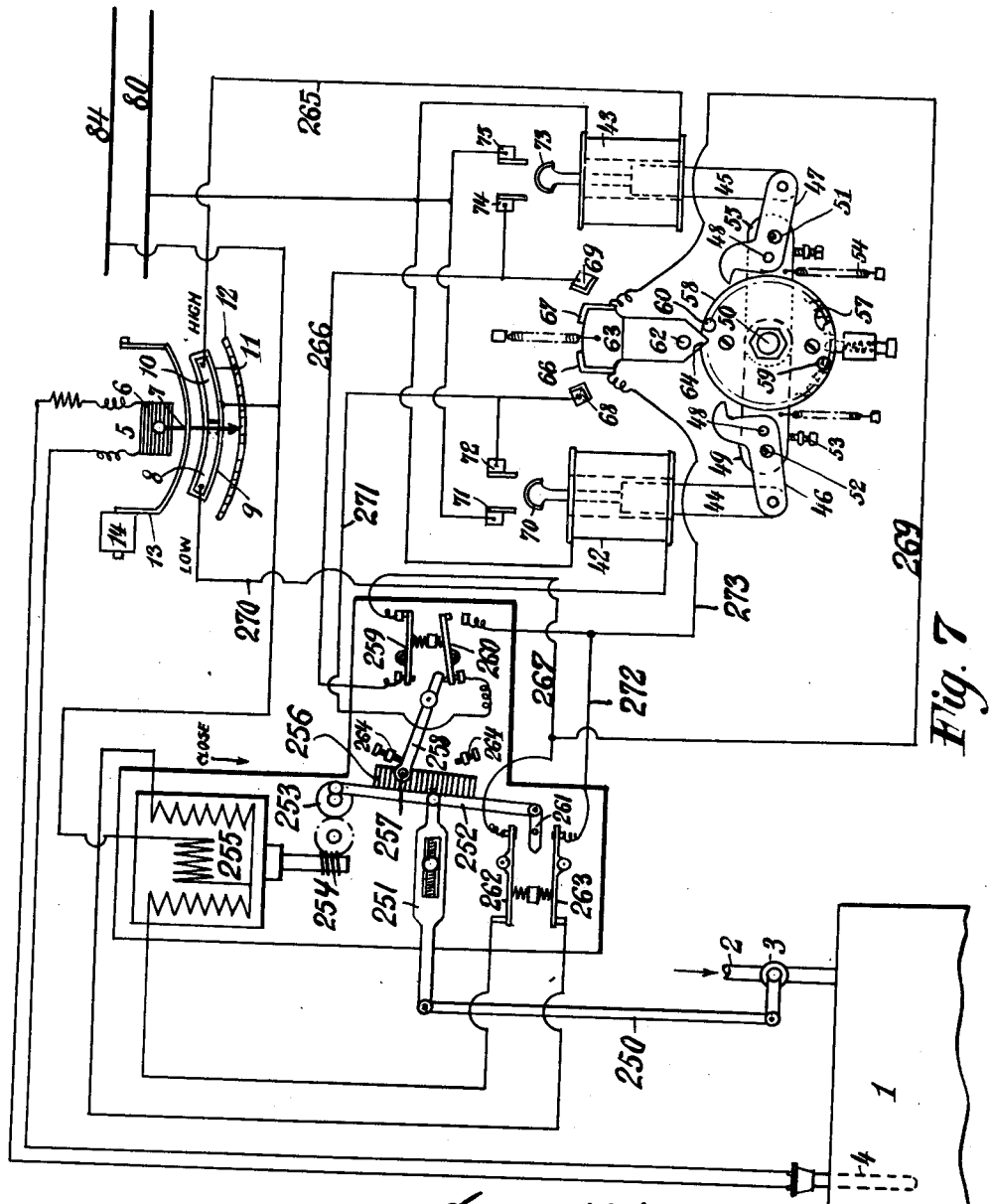

Patented July 4, 1933

1,916,401

UNITED STATES PATENT OFFICE

CHRISTIAN WILHJELM AND GUSTAV H. JOHANSON, OF PHILADELPHIA, PENNSYLVANIA, ASSIGNORS, BY DIRECT AND MESNE ASSIGNMENTS, TO CHRISTIAN WILHJELM, OF PHILADELPHIA, PENNSYLVANIA, AS TRUSTEE

CONTROL SYSTEM AND APPARATUS

Application filed March 27, 1928. Serial No. 265,171.

The object of this invention is to provide a control system and apparatus for use in connection with manufacturing processes in which it is necessary to provide a first immediately responsive control for correcting disturbances from a desired condition, and a second control to be operated after a given period of time in the event that the operation of the first control has been insufficient to correct the disturbance within the period of time necessary to permit the first correction to react or take effect.

Another object of the invention is to provide a mechanism or means whereby the time interval between the operations of the two controls may be made to correspond with the time lag or period of time necessary to show the reaction or effect of the operation of the first control.

When a desired condition has been disturbed and suitable corrective elements operated to restore such condition, some time necessarily elapses before the effect of such corrective operations may be felt or observed. This is called the time lag in the operations. If the time lag is not taken into consideration and compensated for, the operations of the corrective elements result in still further disturbances in the desired condition and final correction and restoration to normal cannot be obtained.

To illustrate: A gas fired boiler has a pressure gauge with electric contacts adjusted so as to maintain 100 pounds pressure. The arrangement is such that the gauge will close one electric circuit at stated intervals if the pressure is below 100 pounds, and another circuit if the pressure is above 100 pounds. The circuits will automatically operate a mechanism to either open or close the supply of gas to the burner under the boiler, and in this manner it has been thought possible to maintain the desired pressure.

This, however, is error, because such a control apparatus fails to include means to compensate for the time lag in the operations. Suppose, for instance, that the pressure rises to 102 pounds and the control cuts down the gas supply. Obviously it will take several minutes before the pressure drops to 100 pounds. During this period, i. e. the time lag, the gas supply remains cut down and by the time the pressure gets back to 100 pounds the supply of gas will be insufficient to maintain the pressure at 100 pounds and it will fall.

Obviously there should be a period of time between each operation of the gas supply control valve to permit the changes in supply to react on the gauge. Apparently this could be accomplished by having the circuits closed at corresponding intervals of time. But this is not satisfactory because during such interval the pressure may vary without correction to such an extent that it may be uncontrollable should the load suddenly be taken off or increased.

It is therefore necessary to provide a control which will respond immediately to a change in the desired condition and which thereafter operates at a certain time interval to permit the changes to react to show whether or not they have been sufficient to restore normal or desired conditions.

Another example will emphasize the necessity of compensating for the time lag in order to obtain perfect control. In the manufacture of paper, the paper mass flows between gates which control the thickness of the mass as it flows to the paper machine. Automatic controls are provided which measure and record the thickness of the finished paper, and which are arranged to regulate the gates.

In this instance the manufacturing process itself includes a time element in the operating speed of the collender rolls in the paper machine. It is therefore necessary to provide a time lag compensating mechanism in the control apparatus in order to delay the final operations of the corrective elements until the corrected increase or decrease of the paper mass has been in effect long enough to pass paper of the correct thickness through the gauges.

The foregoing are merely examples of manufacturing processes requiring a control system and apparatus including a mechanism definitely timed to operate in accordance with the element of time inherent in the manufacturing process itself. In the one example the invention is applied to control the supply of gas. In the other example it is the space between paper gates which is to be controlled. Examples may be multiplied. All of the processes to which the invention is particularly applicable include the factor of a period of time within which the control must operate to accomplish the result aimed at.

The invention is therefore not limited to the control of any particular element. Temperatures, pressures, speed, sizes and the movement of bodies and other elements may be the subject of the control, which therefore also includes a mechanism which is easily adjustable to suit particular conditions and particular or local factors of time.

The invention is shown as applied to the control of a fuel supply valve to a furnace as an illustration of its applicability and not as a limitation. In such a case when the temperature varies plus or minus, the valve must be closed or opened to regulate the fuel supply. Thereafter it is necessary to await the result of the valve operation.

In most cases it will be necessary to cause a further definitely additional operation of the valve to restore normal condition. Obviously, the second operation must occur within or at the end of the period of time required for the effect of the first operation to be observed or shown, on a gauge for instance.

Accordingly my invention is embodied in a control system and apparatus as hereinafter described and as illustrated in the accompanying drawings in which Figure 1 is a diagram illustrating the invention as applied to the control of a fuel supply valve to a furnace and in which two reversible motors are employed for operating the valve.

Figure 2 is a detail view showing parts of the time control mechanism.

Figure 3 is a diagram similar to the one shown in Figure 1 but modified so that only one, reversible motor is employed to operate the valve.

Figure 4 shows a still further modified construction in which a differently constructed time control device is employed.

Figure 5 is a detail view of the time control device shown in Figure 4.

Figure 6 shows another modification in which a thermostat is used as the temperature indicating device.

Figure 7 shows a still further modified diagrammatic embodiment of the invention.

Referring to Figure 1 the reference numeral 1 denotes a furnace which is supplied with fuel through a supply pipe 2 controlled by a valve 3.

The furnace is provided with a temperature registering device of any approved form such for instance, as a thermocouple 4 which is connected to a pyrometer 5 shown conventionally and including the usual movable coil 6 operating a pointer 7 over a contact table which comprises a low contact 8, a high contact 10 and a common contact 9. 12 is the usual depressor pyrometer scale and 13 the usual depressor bar for closing the contacts by depression of the pointer. 14 is a clockwork for operating the depressor bar at predetermined intervals.

The reference character A denotes a reversible electric motor which through suitable reduction gearing 15 rotates a crank disk 16. To the latter there is pivoted a link 17 which is connected to a pivoted switch lever 18 in a limit switch B comprising two movable contacts 19 and 20, and two fixed contacts 21 and 22. C denotes a second reversible electric motor which through a reduction gearing 23 rotates a crank disk 24. To the latter is pivoted a link 25 which actuates a switch lever 26 in a second limit switch D, which comprises two movable contacts 27 and 28, and two fixed contacts 29 and 30.

The link 17 is pivoted at 31 to a valve operating lever 32 which is pivoted on an adjustable floating pivot 33 carried by a base arm 34. The other, lefthand, end of the lever 32 is connected by a link 35 to the valve 3 to operate the latter. The base arm 34 is pivoted at 36 underneath the lever 32. The other, righthand, end of the base arm is pivoted on a nut 37 in threaded engagement with an endless screw 39 operated in a suitable manner from the reducing gearing 23 by means of suitable gearing 40.

The timing mechanism heretofore referred to comprises two solenoids 42 and 43 having plungers 44 and 45, the lower ends of which are pivotally connected to pawls 46 and 47, respectively. The pawl 46 is pivoted at 48 to an arm 49 which is adapted to oscillate on a stud 50, see also Figure 2. The pawl has a movement relative to the arm 49 by means of a hole 51 in the pawl which plays on a pin 52 in the arm. The latter is kept in its normal position against an adjustable stop 53 by means of a spring 54. The other pawl 47 is similarly mounted on an arm 55. The function, operation and controlling parts are alike for the two pawls 46 and 47, and arms 49 and 55, and similar reference characters are employed for like parts thereof.

The pawls 46 and 47 are adapted to engage a ratchet 57 mounted on the stud 50. To the ratchet is detachably secured a timing disk 58 by means of screws as shown. The disk carries two pins 59 and 60. 61 denotes a ratchet latch of any well known construction for compelling stepwise movement of the rachet in a well known manner.

Above the ratchet there is pivoted at 62 a contact lever 63 the lower end 64 of which projects into the path of the pins 59 and 60. The lever 63 is kept in central neutral position by a spring 65 and carries two contacts 66 and 67, properly insulated, which are adapted to engage with fixed contacts 68 and 69.

The solenoid plunger 44 carries at the top a contact 70 adapted to be moved up to bridge between two fixed contacts 71 and 72. The other plunger 45 carries a similar bridging contact 73 adapted to engage with two other fixed contacts 74 and 75. While the temperature remains at the desired level in the furnace, the pyrometer pointer 7 is being depressed at regular intervals, say every ten seconds and remains down for a period of, say, five seconds.

The periods of depressions may of course vary for each individual case. The dividing line between the low and high contacts 8 and 10 is shown slightly to the one side of the pointer 7. In actual practice the contacts 8 and 10 overlap slightly. It is sometimes said that the pointer 7 is then at the control point and will depress either of the contacts in accordance with the minute swingings of the pointer during operating condition. This is usual pyrometer construction and practice.

In the arrangement as shown, a circuit is closed through the motor A when solenoid contact 70 is moved up to engage contacts 71 and 72, whereby the first operation of the valve takes place. The second operation occurs when another circuit is closed through motor C by the engagement of swinging contact 66 with fixed contact 68. On the high side of the apparatus a first circuit is closed through motor A when solenoid contact 73 engages contacts 74 and 75, and a second operation occurs when swinging contact 67 engages fixed contact 69. The gear 57 with disk 58 and pins 59 and 60 constitute a timing mechanism regulating the intervals between the first and second operation. If for instance the gear 57 has forty-eight teeth and the pyrometer contacts are depressed every fifteen seconds, then the disk is advanced four teeth in a minute, eight teeth in two minutes and twenty-four teeth in six minutes. In other words it will take six minutes to make one half revolution or six minutes for one of the pins starting at the bottom to advance to the top and engage the swinging contact lever 63.

The period of six minutes is selected arbitrarily. The period to be selected must equal the time lag of the furnace to insure a second operation, plus or minus, by the closing of either the contacts 67—69 or 66—68.

It is obvious that by selecting another gear and disk with the same or a different number of pins, the time interval between the first and second operation may be varied to suit the time lag in the process or apparatus to be controlled. The operation is as follows. Before the apparatus is installed, the furnace is tested under operating conditions and the average time lag determined upon and the time control mechanism arranged accordingly. The furnace is then started to get the temperature close to the desired working point or operating level. Assume now that the pointer 7 is close to the control point, the circuit of the control apparatus is connected to the line by means of a switch in the usual manner (not shown) and the pins 59 and 60 are set in the position indicated because the first movement of the valve is to be an opening movement. Therefore the first depression of the pyrometer point should be made on the low contact 8. When this happens a circuit is closed through the solenoid 42 from line 80, wire 81, low contact, wire 82, solenoid 42 and out through wire 83 to line 84. The solenoid being thus energized the core is pulled up and contact 70 bridges contacts 71—72 thereby establishing a circuit from this point and through wire 85 to limit switch contacts 22—20, wire 86 motor A and return through wire 87.

The motor A starts at once in a direction to operate crank disk 16 clockwise to open valve 3. The motor is fast running and will complete its run to move the crank disk one half revolution before the depressions on the low contact cease. The movement of the crank disk 16 and link 17 opens the valve and also breaks the motor circuit at limit switch B contacts 22—20 by means of the lever 18 and automatically closes switch contacts 19—21.

The succeeding depressions on the low contact will cause no further operation of the motor A because contacts 22—20 are open. The solenoid 42, however, will continue to be energized intermittently and each time the core 44 is raised the pawl 46 will be swung inwardly into engagement with the gear 57 and move it one tooth, the arm 49 being moved upward at the same time as is obvious. When the plunger drops, the pawl is disengaged from the gear and the arm 49 is pulled down onto the stop 53. The mechanical movement is a double one. First the pawl is lifted around its pivot 48 and on the pin 52 sufficiently to cause engagement with the gear. Secondly, the arm 49 is lifted to cause the pawl to advance the gear one tooth. When the pawl drops, the reverse movements takes place.

It will therefore be seen, that so long as the depressions on the low contact occur, the gear 57 and disk 58 will be rotated clockwise and the pin advanced towards the tongue 64 of the contact lever 63. If now the first opening movement of the valve has been sufficient to admit fuel to such an extent that the temperature has been increased to normal, then the pointer 7 moves back to the control point and its next depression will be on the high contact. If however, the opening movement of the valve has been insufficient to effect the desired raise in temperature, then the pointer 7 will remain on the low contact, the pin 59 will continue its clockwise movement until it engages the tongue 64 and swings contact lever 63 to the left so that contact 66 engages contact 68. We then have a new, second circuit established through the solenoid contacts 72—70—71, wire 88, contacts 68 and 66, wire 89 to limit switch D and wire 90 to motor C and back via 87. Motor C will therefore start and through gearing 40 and shaft 39 cause a second additional opening movement of the valve.

This movement is a slow movement due to the reduction gearings 23 and 40 and the valve 3 will be opened further to admit more fuel. Should even this, the second additional movement of the valve be insufficient to effect the desired change, the depressions will continue on the low contact and successive stepwise opening movements of the valve will occur every six minutes when a pin passes the tongue 64 of lever 63. This will continue until the lever or arm 26 opens the limit switch D contacts 27—29 when further movements of the valve cease, it now being fully open and the circuit through motor C broken.

This, however, may be considered a rather extreme case. Usually the second additional movement of the valve will be sufficient to correct the drop in temperature, the time control mechanism having been adjusted for this purpose.

On the opposite side of the apparatus the same operations will take place tending to close the valve when temperature increases occur. The pointer 7 will then depress high contact 10 and close a circuit via wire 91 to energize high solenoid 43 and the circuit will be completed through solenoid contacts 74—73—75 and wire 92 to limit switch B, contacts 19 and 21 being now closed, thence through wire 93 to motor A and back through wire 87. The motor A then starts in the opposite direction to close the valve and at the end of its run, lever 18 will be moved back to the position shown to open contacts 19—21 and contacts 20—22 will close.

If now the depressions continue on the high contact 10, the solenoid 43 will be intermittently energized and close contacts 74 and 75 but no current can pass through the motor A because contacts 19—21 are open. However, the pin 60 will now be moved towards the tongue 64 of lever 63 and finally engage said tongue to swing the lever so that contact 67 engages contact 69.

This closes a circuit through motor C as follows. Through contacts 69—67, wire 94, limit switch D contacts 30—28, wire 95, motor C and return as before. Motor C will now be operated in the opposite direction and will actuate screw shaft 39 to cause a further additional closing movement of the valve, operating in the same slow manner as during the opening movement.

It will therefore be seen, that when depressions occur on the low side of the pyrometer, the first depression, (occurring after the pointer leaves the high contact) will close the circuit through the motor A to cause the first opening of the valve. If, within the time lag period, this movement is sufficient, the correction will have been accomplished and no further movement takes place or is required on the low side. In this event, the pointer has moved back to the high side and the first depression occurring on the high side (after the pointer has left the low side) causes a first closing movement of the valve.

If, at the end of the time lag period, the movement of the valve either way has been insufficient, a further movement, either way, occurs automatically. In other words, the control apparatus according to this invention provides the necessary mechanism for further opening (or closing) of the valve at the end of the time lag period until the desired condition has been restored. Thus, what is known as "hunting" is eliminated.

Figure 3 illustrates a control apparatus which is constructed and operated in accordance with the invention, but which is modified in certain respects so that only one reversible motor is required for operating the valve. In this figure the pyrometer elements and the time mechanism are duplicates of those shown in Figures 1 and 2 and their circuits are the same. These elements are therefore numbered with like reference numerals.

However, the time control mechanism is provided with an additional switch element constructed as follows. The numeral 100 denotes a switch lever which is suitably pivoted intermediate its ends as at 101 and kept in either one of its two contact positions by a spring 102 in an obvious manner. This lever 100 carries two contacts 103 and 104 suitably insulated and adapted to engage respectively two fixed contacts 105 and 106. At each end of the lever 100 there is an anvil 107 and 108 adapted to be engaged by hammers 109 and 110, pivoted to the solenoid plungers 44 and 45.

The valve 3 is operated by a link 112 pivoted to an arm 113 which at its other end is pivoted to a link 114 operated from a crank disk 115 driven by suitable reducing gearing 116 from a reversible motor 117. The link 114 operates an arm 18 for actuating the limit switches 125—126 and 127—128 as described in connection with Figure 1. As described above, we assume that first depression occurs on the low contact 8. The solenoid 42 will be energized via line 80, wire 81, contacts 9—8, wire 82, the solenoid 42 and wire 83 to line 84. The solenoid contacts 72, 70 and 71 will be closed and current will pass to the motor 117 from 71 through wire 118 to contacts 105 and 103, and wire 119 to limit switch contacts 125—126 to the motor. The latter will start, and through elements 114, 113 and 112 open the valve.

When now the pointer 7 is lifted after the first depression, the solenoid core 44 will drop, the hammer 109 falls on anvil 107, breaks the motor circuit at 105—103, and causes the other end of lever 100 to rise. The anvil 108 will push hammer 110 to the right, these parts being suitably proportioned to accomplish this result and contacts 104 and 106 will engage.

Succeeding depressions on the low side will therefore not etablish any circuits through the motor, but as the solenoid 42 is energized, the core 44 will actuate pawl 46 to operate the gear 57. The pin 59 will therefore move towards the lever 63, finally reach the latter and throw it to close contacts 66—68. This establishes a new circuit to the motor as follows. From contact 71 to contacts 66 and 68, thence through wire 120 to the limit switch contact 125—126 to the motor 117 again starting the latter in the same direction as before and of course giving the valve a further additional opening movement.

On the opposite side of the apparatus similar operations occur tending to close the valve when the temperature increases. The pointer will then depress on the high contact 10 and close a circuit from line 80, through the pyrometer and wire 129 to high solenoid 43. Consequently solenoid contacts 73—74—75 will engage to establish a circuit from line 84 through wire 130, contacts 106—104 (which are now closed,) wire 131 and limit switch contacts 127—128 to the motor 117 starting the latter in the opposite direction to close the valve. When the pyrometer pointer moves upwards from the high contact 11, the circuit through the solenoid 43 is broken and the hammer 110 falls on the anvil 108 breaking the motor circuit. Succeeding depressions on the high side then continue, resulting in moving the disk 57 anticlockwise. If the first closing movement has been insufficient, the pin 60 will finally strike the lever 63 closing contacts 67—69. Current will then pass from line 84, through solenoid contacts 75—73—74, contacts 67—69, wires 132—131 and to the motor again starting it to still further close the valve.

Of course, if the movements of the valve are not sufficient, further movements in either direction will occur at time lag intervals until the circuits are finally broken on either side of the limit switch the same as described above.

Figure 4 illustrates a further modified embodiment of the invention which is different in that the time control element is in the form of a cam having a definite number of high points or teeth depending upon the requirements of the local condition. In this instance the valve 3 is operated by a link 150 connected to an arm 151 pivoted on an adjustable pivot 152 carried on a pivoted base 300. The arm 151 is swung on its pivot to move the valve through the instrumentality of a link 153 one end of which is connected to the said pivoted base 300, the other end of which is pivoted to a nut 154 in threaded engagement with a screw shaft 155. The latter carries a gear 156 in mesh with another gear 157 on a short shaft 158 which also carries a clutch member 159 adapted to be engaged by a cooperating clutch member 160 on a sliding rotating shaft 161. The latter is driven by a gear 162 meshing with a gear 163 on an actuating shaft 164. The latter also carries a worm 165 which drives a wormwheel 166 on a cam shaft 167 which carries the timing cam 168. A clutch lever 169 pivoted at 170 is in engagement with the cam and the sliding shaft. The shaft 164 drives the cam shaft through worm and wheel 165 and 166 and also drives the sliding clutch shaft through gears 163 and 162.

The actuating shaft 164 is driven through suitable gearing 171 from a second reversible motor 172. The arm 151 carries at its lower end a lever 173 which operates limit switch lever 174 to open either of the switches 175 or 176. At 177 there is pivoted to the arm 151 a link 178 operated from a crank disk 179 driven from the first motor 180. The link 178 operates limit switch lever 181 adapted to open either of the switches 182 and 183.

Limit switches 175 and 182 are connected by wires 184 and 185 to a relay 186 actuated by a coil 187. Limit switches 176 and 183 are connected to another relay 188 by wires 189 and 190, respectively. Relay 188 is actuated by a coil 191. The relay coils are connected in series with the low and high contacts across the line 80—84. Assuming that in this case the first depression occurs on the high contact 10, a circuit will be closed through the relay coil 187 and the high contact relay 186 will close. Current will then pass from the line 84, through the relay arm and relay 186, wire 185 to limit switch 182 and through wire 192 to motor 180 and back to the line. The motor will start and drive crank disk 179 one half revolution and through link 178 operate the arm 151 to close the valve. The link 178 also operates switch lever 181 to open limit switch 182 to break the motor circuit and the motor stops.

The temperature then slowly decreases and the pointer 7 swings back to the control point. When next a depression occurs on the low contact, a circuit is established across the line through low relay coil 191 and the low relay 188 closes. Current will then pass from the line to the low relay arm and low relay 188, wire 190 to limit switch 183, which is now closed, and through wire 193 to motor 180, which will commence operating in the opposite direction thereby rotating the crank disk 179 back to open the valve and open limit switch 183 to break the motor circuit.

The advantage of using a reversible motor is, that if the pyrometer pointer depressions are of so short duration, that the movement of the crank is not completed on one depression and before the pointer depresses on the opposite side of the control point, the motor will reverse the crank movement regardless of the position of the crank.

In other words, the response is immediate. From this it will be clear that motor 180 operates the valve either way in immediate response to the temperature variations.

The second motor 172 actuates the valve further through the medium of the time controlling mechanism, i. e. the cam 168 in the event the temperature does not return to normal after a given time, after the first motor 180 has been operated. The operation is as follows. At the closing of high relay 186, as described above, current also passes through wire 184 to limit switch 175 and wire 194 to motor 172 which starts to operate in a direction to still further close the valve through the instrumentalities of gearing 171, shaft 164, worm 165, worm wheel 166, cam shaft 167 to rotate cam 168. When a high point of the latter actuates lever 169, the clutch 160—159 will be thrown in and through gears 157 and 158 the shaft 155 will be rotated to operate link 153 to move the arm 151 and still further close the valve in the event the first closing movement caused by motor 180 has been insufficient.

On the other side, when the low relay 188 is closed, current also passes through wire 189 to limit switch 176 and through wire 195 to motor 172 operating it in the opposite direction to cause a further opening movement of the valve. In either case, the operation of motor 172 is slow and will continue until lever 174 opens either the limit switch 175 or 176 to break the motor circuit and stop the second motor.

It will therefore be seen, that irrespective of the frequency of closing of the pyrometer contacts, the second movement of the valve will occur only after a certain definite time interval has elapsed after the first movement has been completed the time element being controlled by the number of high points on cam 168.

The form of the cam will of course be designed so as to provide a time interval in operations between the two motors in accordance with the time lag in the furnace. It will also be noted and understood that when the depressions on one or the other side cease, the corresponding relay, 187 or 188, will become deenergized and break the circuit.

Figure 6 shows a still further modification of the invention in which the valve 3 is operated by a link 200 connected to an arm 201 pivoted at 202. The arm is operated by a link 203 from a single reversible motor 204 through suitable reducing gearing 205. The link 203 also actuates a lever 206 for opening limit switches 207 and 208.

The temperature indicating device is in this instance a thermostat 209 strong enough to make contact with the low contact 210 or high contact 211 without requiring a special depressor mechanism. The numerals 212 and 213 denote solenoids for closing the switch contacts 214, 215, 216 and 217 on the low side, and similar contacts 218 to 221 inclusive on the high side. The timing mechanism is in the form of an interruptor comprising a cam 222 driven by a small motor 223 and adapted to close contacts 224 and 225 on the one side, and contacts 226 and 227 on the opposite side. The parts are shown in normal positions.

When the temperature decreases within the furnace 1, the thermostat member 209 will move and contact with low contact 210 establishing a circuit as follows: From line 80, to 209, 210 to solenoid 212 and back through wire 228 to line 84. The solenoid will be energized and pull up its core thereby closing the switch contacts 214 to 216 inclusive. Current will then pass from the line 84 via wire 228, contacts 214 and 215, wire 229 to limit switch 208, wire 230 to motor 204, thence back through wire 231, contacts 224 and 225 (if they are closed), and to the line 80 by wire 232.

The motor then starts and through the elements 205, 203, 201 and 200 operate to open the valve to a certain definite extent. At the end of the movement the arm 206 will open limit switch 208.

Current also passes from wire 228 to contacts 216—217 and through wire 234 to interruptor motor 223, and back through wire 232. This starts the interruptor motor so that if contacts 224—225 should be open, they will be closed at the first movement of the motor 223. The latter alternately interrupts the motor circuit, which otherwise is closed so long as the thermostat is on the low contact. The parts are so arranged that the motor circuit is made at regular intervals and at frequencies depending upon the shape of the interruptor cam 222 and speed of its motor 223, thus operating the motor 204 to give definite additional movements of the valve with such time intervals as are required for the particular installation in accordance with the local time lag in the furnace. Of course, at the end of the opening movement of the valve, the motor circuit is definitely broken at the limit switch 208, but at or prior to this time the control will have operated to bring about the required increase in temperature and the thermostat will go back to normal.

When the temperature increases, the thermostat makes contact at high contact 211. Consequently solenoid 213 is energized to close switch contacts 218 to 221 inclusive. Current then passes to the motor 204 as follows. Line 84, wire 228, contacts 218—219, wire 235 to limit switch 207, wire 236 to motor 204 and return as before. The motor then starts in the opposite direction to close the valve.

Current also passes from wire 228 to contacts 220—221 and 217 to wire 234 to the interruptor motor 223 as before and back through wire 232 to line 80. The operations on the high side of the apparatus are like the ones described above for the low side, except that of course the motor now operates to close the valve. At the end of movement of the valve the motor circuit is definitely broken by lever 206 opening the limit switch 207.

Figures 7 illustrates a still further modification of the invention in which a specially constructed limit switch is employed. The valve 3 is in this case operated by a link 250 pivoted to an arm 251 which is operated by a link 252 from a crank disk 253 driven through suitable gearing 254 from a reversible motor 255. The link 252 has secured to it a toothed or multi-grooved plate 256. The teeth on the plate are adapted to be engaged by a pin 257 fast in a switch lever 258 adapted to open either of the two limit switches 259 and 260. In addition, the link 252 operates an arm 261 adapted to open either one of two other limit switches 262 and 263. The arm 258 is springy so that there is provided a relative movement between the toothed plate 256 and the pin 257, the latter being arranged to move or snap from one groove or tooth to another. Adjustable stops 264 may be used to limit the movements of the arm 258. A pyrometer and time control mechanism as hereinbefore described are included in the apparatus in Figure 7.

Assuming that depressions of the pyrometer pointer 7 occur on the high contact 10, the solenoid 43 will be energized via wire 265 to close contacts 75—73—74 as above described. Current will then pass from the line, through the solenoid contacts and wire 266 to limit switch 259, wire 267 to limit switch 262 to the motor 255 and back to the line.

The motor will start operating in a direction to close the valve and move the toothed plate 256 in direction of the arrow marked "close". The movement will continue so long as the two limit switches 259 and 262 remain closed. During this movement the switch lever 258 offers no resistance to the movement of the pin 257 which is being carried along with the plate 256. The movement continues until the switch lever 258 has moved to its other extreme position where it opens limit switch 259 and breaks the motor circuit. The valve movement then stops.

Continued depressions on the high contact 10 will, however, as hereinbefore set forth, finally result in the pin 60 of the timing mechanism striking the lever 63, and current will then pass from solenoid contact 74 to contacts 69 and 67, thence through wire 269 direct to limit switch 262 and to the motor as before. The motor will again operate every time a depression occurs on high and operate to close the valve further until such time, that either the temperature disturbance has been corrected and the pointer 7 goes back to low, or until the limit of the valve movement has been reached when arm 261 will reach and open limit switch 262. During the continued movements of the link 252, the plate 256 will continue to move under the pin 257 which latter will jump from tooth to tooth on the plate.

When now depressions occur on the low side of the apparatus, solenoid 42 will be energized via wire 270. Contacts 71—70—72 will engage and current will pass through wire 271 to limit switch 260, which is now closed. Thence through wire 272 to limit switch 263 and to the motor starting the latter in the opposite direction to open the valve. The plate 256 will now be moved back taking the pin 257 along and swing switch lever 258 to the position shown in the drawings to open limit switch 260 to break the motor circuit and stop the motor.

If depressions continue on low, the time mechanism will operate anti-clockwise as before and pin 59 will engage lever 63 to close contacts 66—68. Current will then again pass to the motor from contact 72 to 66—68, wire 273 direct to limit switch 263 and to the motor, which again starts up to still further open the valve. The movement continues until the valve opening movement is reached or the circuit broken by arm 261 opening limit switch 263.

From the foregoing it will be clear, that the first time a depression occurs on either the high or the low contact, the valve will be operated in immediate response. Thereafter further, balancing, movements of the valve occur in the event the first movement has been insufficient to effect the necessary change in the temperature.

The initial or first movement of the motor automatically and immediately actuates the limit switch lever 258 irrespective of the position of the valve. The movements of the lever 258 are regulated by adjusting the stops 264, and the timing operation is regulated in conformity with local conditions, i. e. the time lag by adjusting the pins 59 and 60, or by varying the number of pins.

From the foregoing it will be clear that this invention provides an automatic electrically operated control mechanism by means of which one or more elements may be operated so as to maintain desired or normal conditions in a manufacturing operation by dividing the operations so that a disturbance in conditions is responded to at once for corrective purposes. That, if such immediate response serves the purpose, no further operations occur. But if the first immediate response has not served the purpose, the apparatus will automatically operate after a given period of time, which latter may be adjusted and regulated in accordance with the conditions peculiar to the local problem.

The several disclosures herein indicate the elasticity and scope of the invention to suit varying conditions. The distinguishing feature of the invention is the time controlling mechanism. It is obvious, that whereas the invention is herein disclosed in its preferred form and variations thereof, nevertheless, the possibilities of other embodiments are not thereby exhausted. The invention is therefore not limited to the precise details disclosed, but changes may be made without departing from the principle of the invention and the scope of the appended claims.

We claim:—

1. In combination with a furnace and a valve for controlling the fuel supply thereto, an electric circuit including a reversible motor for operating the valve, a timing device for controlling the operations of the motor, means for closing said circuit periodically to establish a circuit to the motor through the said timing device to cause said valve to be operated in immediate response to temperature changes within the furnace, means in said timing device for automatically breaking the motor circuit after the valve has been operated and other means in said timing device for automatically establishing another operating circuit through the motor after a predetermined period of time.

2. In combination with a reversible electric motor and its actuating circuit, a device in the circuit for controlling the operations of the motor comprising a switch lever for normally establishing a circuit through the motor in a given direction, a contact lever for establishing another circuit through the motor in the same direction, a pyrometer for closing a first circuit to the motor through the said switch lever, means for automatically operating said switch lever to break the said motor circuit after the motor has been operated and automatic means for operating said contact lever to establish the said other circuit through the motor in the same or opposite direction to the first said circuit.

3. In combination with a reversible electric motor and its operating circuit, a device in the circuit for controlling the operations of the motor comprising a switch lever for normally establishing a first circuit through the motor in either direction, a contact lever for establishing a second circuit through the motor in the same or opposite direction to that established by the switch lever, a timing device for operating the contact lever, a pyrometer for closing the said first circuit through the switch lever, means for automatically operating the switch lever to break the said first circuit and means in said timing device to operate said contact lever to establish the second motor circuit after a predetermined time interval subsequent to the operation of the said switch lever.

CHRISTIAN WILHJELM.
GUSTAV H. JOHANSON.